K. S. GINGERICK.
STEERING GEAR FOR MOTOR PROPELLED VEHICLES.
APPLICATION FILED MAY 1, 1922.

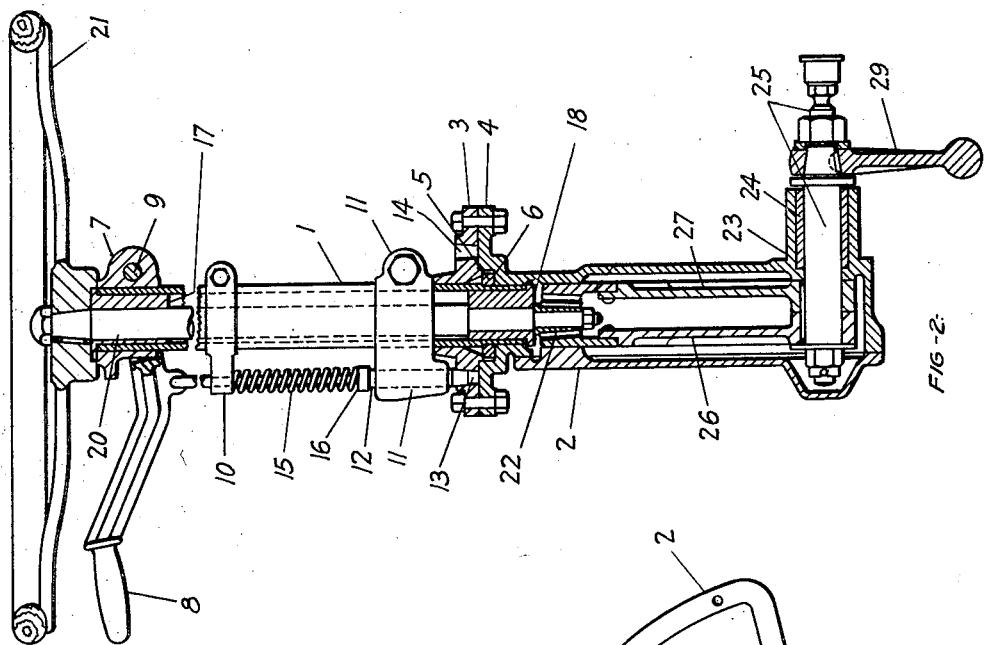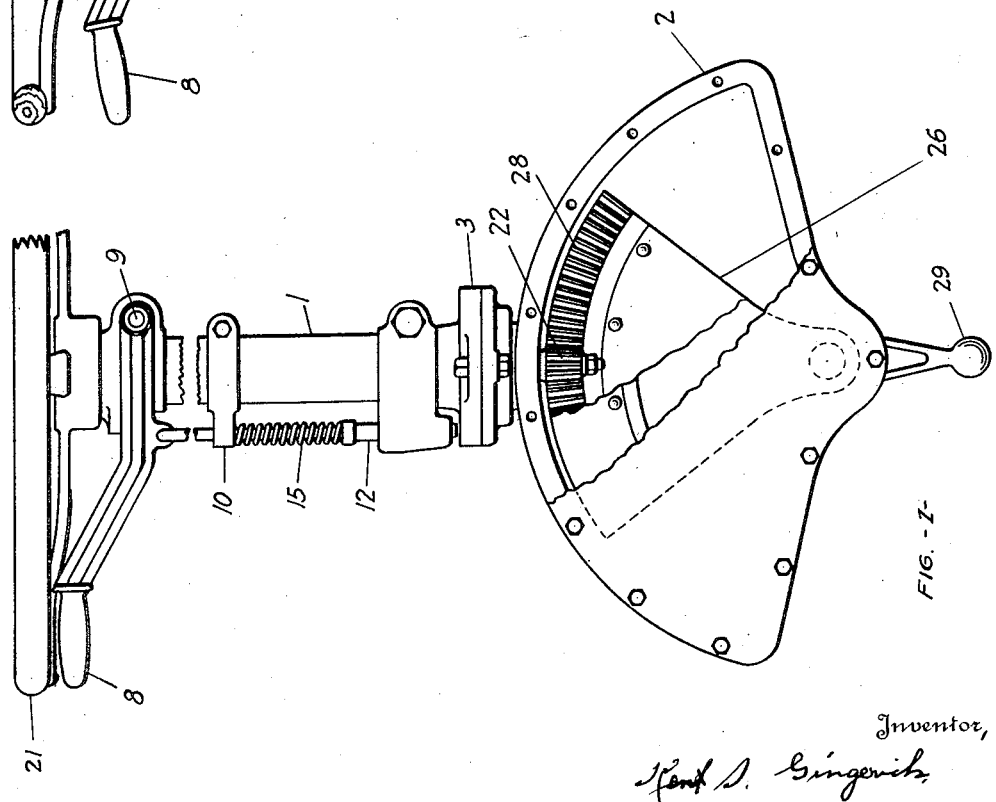

1,429,029.   Patented Sept. 12, 1922.
2 SHEETS—SHEET 2.

Patented Sept. 12, 1922.

1,429,029

UNITED STATES PATENT OFFICE.

KENT S. GINGERICK, OF URBANA, OHIO, ASSIGNOR TO RIAL T. PARRISH, OF DAYTON, OHIO.

STEERING GEAR FOR MOTOR-PROPELLED VEHICLES.

Application filed May 1, 1922. Serial No. 557,526.

*To all whom it may concern:*

Be it known that I, KENT S. GINGERICK, a citizen of the United States, residing in the city of Urbana, in the county of Champaign and State of Ohio, have invented certain new and useful Improvements in Steering Gears for Motor-Propelled Vehicles, of which the following is a specification.

This invention relates to improvements in steering gears for motor propelled vehicles, and particularly to tractors, and is peculiarly adapted to that type of tractor known as the "two way" plow tractor.

It is well known that in motor propelled vehicles, of which the tractor is a type, it is necessary in order to guide the vehicle in a reverse or rearward direction, to throw or turn the steering wheel in a direction opposite to that in which it is thrown when proceeding in a forward direction.

It will be readily understood then, that in motor propelled vehicles, and particularly in that type known as "two way" plow tractors, in which it is desirable for the operator to face the rear during the rearward movement of the vehicle, it is expedient to adapt or construct a steering gear which will guide the vehicle in the rearward direction with the same relative motions as in the forward direction. In other words, when the vehicle is proceeding in the forward direction and it is desired to turn to the right, the steering wheel is turned to the right; and should a right turn be desirable when proceeding in the rearward direction, my invention enables this turn to be effected by turning the steering wheel to the right.

Figure 3:
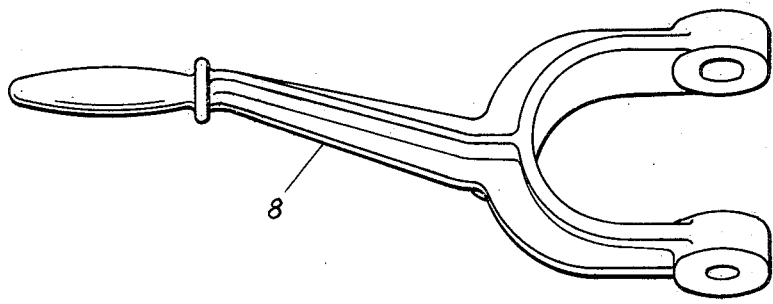
Figure 4:
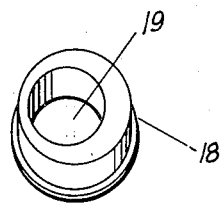
Figure 5:
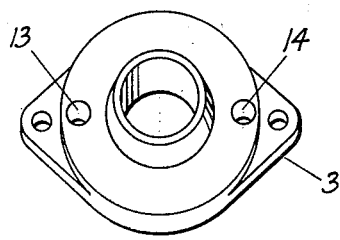
Figure 6:
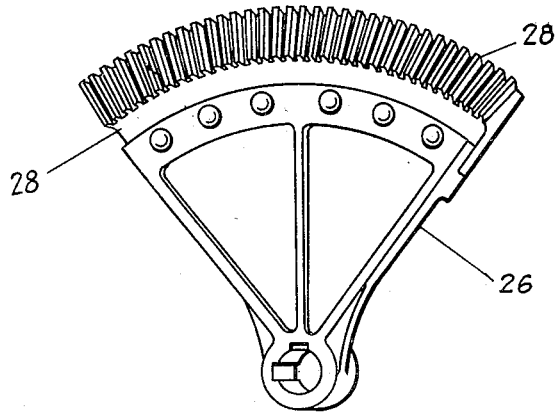

In the accompanying drawings, Figure 1 is a side elevational view, partly broken away, of my improved steering device applied to a tractor of the "two way" type. Figure 2 is a partial side elevation and a partial section of the same. Figure 3 is a perspective view of the handle or lever for operating the eccentric bushings. Figure 4 is a perspective view of one of said bushings. Figure 5 is a perspective view of the indicating or locating flange. And Figure 6 is a perspective view of one of the segmental bevel gears.

Throughout the specification and drawings, similar reference characters denote corresponding parts.

In a detailed description of the form of embodiment of my invention illustrated in the accompanying drawings, the numeral 1 designates a tubular steering column which is rotatable in a gear case 2 and a flange 3 bolted to the upper flanged end 4 of said case. Fixedly attached to the lower end of the tubular steering column 1 is an annular ring 5 which supports the latter by rotating on an annular shoulder 6 in the upper part of the gear case 2, and prevents an upward movement of said steering column by bearing against the flange 3. (See Figures 3 and 5.)

Firmly secured to the upper end of the steering column 1, is a sleeve 7 to which a forked lever 8 is hingedly secured by means of a pin 9. (See Figures 2 and 3.) Clamped on the outside of the tubular steering column 1, which is adapted to be turned by the lever 8, are two split collars 10 and 11 through vertically disposed holes in the outer ends of which there passes a lock or index pin 12. The upper end of the latter is hooked through a hole in the forked lever 8, and its lower end is adapted to enter one of two holes 13 and 14 in the flange 3 to firmly secure the steering column in one of two operating positions. A compression spring 15 encircles the pin 12 between the collar 10 and a shoulder 16 on said pin to normally hold it in either one of the two holes 13 and 14 after the steering column has been turned by the lever 8. (See Figures 2 and 5.)

In the upper and lower ends of the steering column 1 there are fixedly secured eccentric bushings 17 and 18 respectively. Through an eccentrically disposed hole 19 in each one of these bushings 17 and 18 there projects a steering shaft 20 free to rotate in said bushings, and to be moved from one operating position to another by them. Secured to the upper end of the shaft 20 is a steering wheel 21, and on its lower end there is fast a bevel pinion 22. (See Figures 2 and 4.)

At its lower end the gear case 2 terminates in a horizontal sleeve portion 23 which contains a bushing 24 in which there rotates a transverse shaft 25. Fixedly secured to the latter inside the gear case 2, are two segmental arms 26 and 27 such as the one shown in Figure 6. Riveted or otherwise suitably secured to the outer periphery of each one of said segmental arms, is a sector-shaped bevel gear 28 adapted to mesh with the bevel pinion 22 when the latter is moved into engagement with it.

When it is desired to operate the tractor in a direction opposite to that in which it has been running, the driver takes a position behind the steering wheel 21 facing that direction. He then lifts the lever 8 a sufficient distance to disengage the lock pin 12 from the flange 3, and then turns said lever to the opposite side of said flange where the lock pin 12 is forced into one of the holes 13 or 14 therein by the spring 15.

When the lever 8 is given the turn above described, it will rotate the eccentric bushings 17 and 18 a sufficient distance to move the shaft 20 to a position where the pinion 22 on its lower end will engage the gear 28 on the segmental arm opposite that in which it was in engagement. When the steering wheel 21 is now turned, it will rotate the shaft 20 to cause the bevel pinion 22 thereon to actuate the segmental arm in the direction it should turn the shaft 25 to effect the desired steering movement. It is thus possible through the turning of the eccentric bushings 17 and 18 by the lever 8, to shift the position of the shaft 20 to bring the pinion 22 on its lower end into engagement with the gear 28 on either one of the segmental arms 26 or 27, and thereby to enable the steering wheel 21 to be turned in the ordinary manner by the operator behind it, irrespective of the direction in which the tractor is running.

I do not wish to be limited to the details of construction and operation herein shown and described, and any changes or modifications may be made therein within the scope of the subjoined claims.

Having described my invention, I claim:

1. In a device of the type described, the combination with a rotatable steering column, of an eccentric member fast within said column, a steering shaft rotatable in said eccentric member and adapted to be moved from one extreme position to another by it, a transverse shaft, a pair of segmental gears fixedly secured to said shaft, and a pinion secured on the lower end of the steering shaft for engagement with one or the other of said segmental gears when the eccentric member is turned by the steering column.

2. In a device of the type described, the combination with a steering column, of an upper bushing and a lower bushing fixedly secured therein, each bushing containing an eccentrically disposed hole therein, a steering shaft projecting loosely through the holes in said bushings, a steering wheel fast on the upper end of said shaft, a pinion fixedly secured to the lower end of said shaft, a transverse shaft, and a pair of segmental gears secured to the transverse shaft, one of which is adapted to be engaged by said pinion when the bushings are turned in one direction and the other one of which is adapted to be engaged by said pinion when the bushings are turned in the opposite direction.

3. In a device of the type described, the combination with a rotatable steering column, of an upper bushing and a lower bushing fixedly secured therein, each bushing containing an eccentrically disposed hole therein, a steering shaft projecting loosely through the holes in said bushings, a steering wheel fast on the upper end of said shaft, a pinion fixedly secured to the lower end of said shaft, a transverse shaft, a pair of segmental gears secured to the transverse shaft for alternate engagement by said pinion, and a lever secured to the steering column just below the steering wheel, for turning said bushings to move the steering shaft a sufficient distance to bring the pinion on its lower end into firm engagement with one or the other of said gears, for the purpose specified.

4. In a device of the type described, the combination with a rotatable steering column, of an upper bushing and a lower bushing fixedly secured therein, each bushing containing an eccentrically disposed hole, a steering shaft projecting loosely through said holes, a steering wheel fast on the upper end of said shaft, a pinion fixedly secured to the lower end of said shaft, a transverse steering shaft, a pair of segmental gears secured to the latter, for alternate engagement by said pinion, a sleeve secured to the upper end of said steering column, a lever hingedly secured to said sleeve, a flange through which the lower end of said steering column projects, containing a hole in each side thereof, and a pin whose upper end is secured to said lever and whose lower end is adapted to enter either one of said holes in the flange for the purpose specified.

In testimony whereof I have hereunto set my hand this 21st day of April, 1922.

KENT S. GINGERICK.

Witness:
HOWARD S. SMITH.